United States Patent
Mukherjee et al.

(10) Patent No.: US 11,915,061 B2
(45) Date of Patent: Feb. 27, 2024

(54) DATACENTER EFFICIENCY MANAGEMENT SYSTEM FOR MIGRATING WORKLOAD ACROSS NODES BASED ON WORKLOAD PERFORMANCE EFFICIENCY RANKING

(71) Applicant: Dell Products L.P., Round Rock, TX (US)

(72) Inventors: Rishi Mukherjee, Bangalore (IN); Ravishankar Kanakapura Nanjundaswamy, Bangalore (IN); Prasoon Sinha, Bangalore (IN); Raveendra Babu Madala, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 113 days.

(21) Appl. No.: 17/510,601

(22) Filed: Oct. 26, 2021

(65) Prior Publication Data
US 2023/0129548 A1    Apr. 27, 2023

(51) Int. Cl.
G06F 9/50    (2006.01)
G06F 9/48    (2006.01)

(52) U.S. Cl.
CPC .......... *G06F 9/5094* (2013.01); *G06F 9/4856* (2013.01); *G06F 9/5055* (2013.01); *G06F 9/5077* (2013.01); *G06F 2209/501* (2013.01); *G06F 2209/508* (2013.01); *G06F 2209/5022* (2013.01); *Y02D 10/00* (2018.01)

(58) Field of Classification Search
None
See application file for complete search history.

(56) References Cited

U.S. PATENT DOCUMENTS

| | | | |
|---|---|---|---|
| 9,501,115 B2 | 11/2016 | Mandagere et al. | |
| 2010/0037077 A1* | 2/2010 | Kashyap | G06F 9/5094 713/330 |
| 2013/0318371 A1* | 11/2013 | Hormuth | G06F 11/3062 713/320 |
| 2014/0149761 A1* | 5/2014 | Allen-Ware | G06F 1/3206 713/320 |

(Continued)

FOREIGN PATENT DOCUMENTS

CN    111240836 A  *  6/2020  .......... G06F 9/5044

*Primary Examiner* — Abu Zar Ghaffari
(74) *Attorney, Agent, or Firm* — Joseph Mencher

(57) ABSTRACT

A datacenter includes a datacenter efficiency management system coupled to node devices. For each of the node devices and based on a power consumption associated with that node device and a performance associated with that node device, the datacenter efficiency management system generates a node group ranking that it uses to group subsets of the node devices into respective homogenous node groups, and then deploys a respective workload on at least one node device in each of the homogenous node groups. Based on at least one of a node workload bandwidth, a node power consumption, and a node health of each node device on which a workload was deployed, the datacenter efficiency management system then generates a workload performance efficiency ranking of the node devices that it then uses to migrate at least one workload between the node devices.

20 Claims, 14 Drawing Sheets

(56) References Cited

U.S. PATENT DOCUMENTS

| | | | | |
|---|---|---|---|---|
| 2014/0359310 A1* | 12/2014 | Haridass | ............... | G06F 1/3206 |
| | | | | 713/300 |
| 2015/0248312 A1* | 9/2015 | Brochard | .............. | G06F 1/3206 |
| | | | | 718/103 |
| 2015/0301572 A1* | 10/2015 | Zhou | ..................... | G06F 1/3203 |
| | | | | 713/320 |
| 2016/0320825 A1* | 11/2016 | Panda | ..................... | G06F 1/329 |
| 2016/0380921 A1* | 12/2016 | Blagodurov | ............ | G06F 3/067 |
| | | | | 709/226 |
| 2017/0160781 A1* | 6/2017 | Piga | ..................... | G06F 1/3287 |
| 2017/0230733 A1* | 8/2017 | Rana | ..................... | H04Q 9/00 |
| 2017/0279926 A1* | 9/2017 | Eastep | ................... | H04L 43/12 |
| 2017/0310556 A1* | 10/2017 | Knowles | ............ | H04L 67/1097 |
| 2017/0322241 A1* | 11/2017 | Tang | ..................... | G06N 20/00 |
| 2018/0074560 A1* | 3/2018 | Matteson | ............... | G06F 1/3296 |
| 2018/0101215 A1* | 4/2018 | Mahindru | ............. | G06F 1/3296 |
| 2021/0294651 A1* | 9/2021 | Misca | .................. | G06F 9/5061 |
| 2022/0197773 A1* | 6/2022 | Butler | ................... | G06F 9/5038 |
| 2022/0261295 A1* | 8/2022 | Nagaraja | ................ | G06F 18/23 |

* cited by examiner

DATACENTER EFFICIENCY MANAGEMENT SYSTEM FOR MIGRATING WORKLOAD ACROSS NODES BASED ON WORKLOAD PERFORMANCE EFFICIENCY RANKING

BACKGROUND

The present disclosure relates generally to information handling systems, and more particularly to managing the efficiency of information handling systems included in a datacenter.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices in datacenters, are sometimes grouped together and utilized to perform workloads. For example, some datacenters include server cluster managers that group server devices together in server clusters, and then deploy workloads on those server clusters for performance by server devices in those server clusters. However, conventional server cluster managers do not deploy workloads on specific server devices (workloads are randomly deployed on server devices within a cluster to which they are provided) and, as such, workloads may be performed by server devices in an inefficient manner, which can lead to inefficient datacenter operation. For example, workloads may be deployed on server devices that consume a relatively high amount of power in performing those workloads, thus providing for inefficient use of the power available in the datacenter and increasing the costs of operating that datacenter.

Accordingly, it would be desirable to provide a datacenter efficiency management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a datacenter efficiency management engine that is configured to: generate, for each of a plurality of node devices based on a power consumption associated with that node device and a performance associated with that node device, a node group ranking; group, based on the node group ranking of each of the plurality of node devices, subsets of the plurality of node devices into respective node groups; deploy a respective workload on at least one node device in each of the node groups; generate, based on at least one of a node workload bandwidth, a node power consumption, and a node health of each node device on which a workload was deployed, a workload performance efficiency ranking for that node device; and migrate, based on a first workload performance efficiency ranking of a first node device included in the plurality of node devices and a second workload performance efficiency ranking of a second node device included in the plurality of node devices, a first workload between the first node device and the second node device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
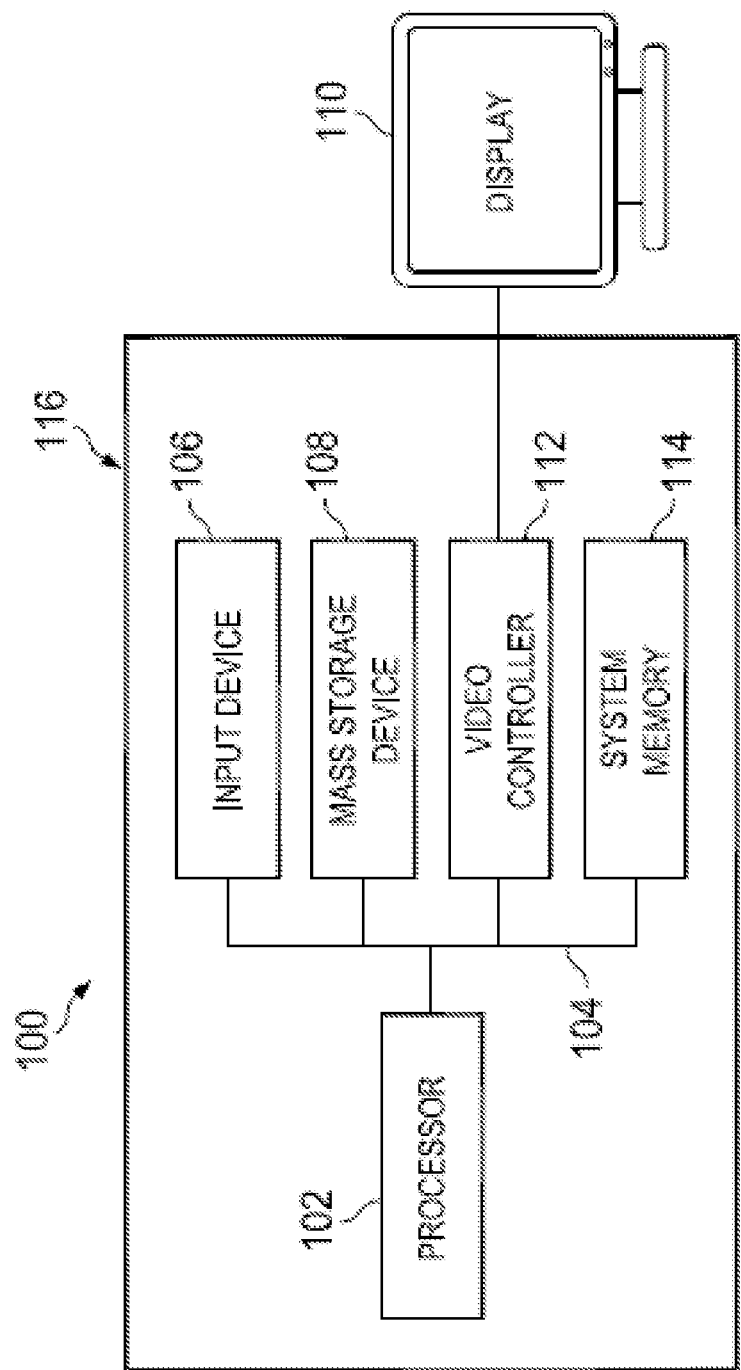
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
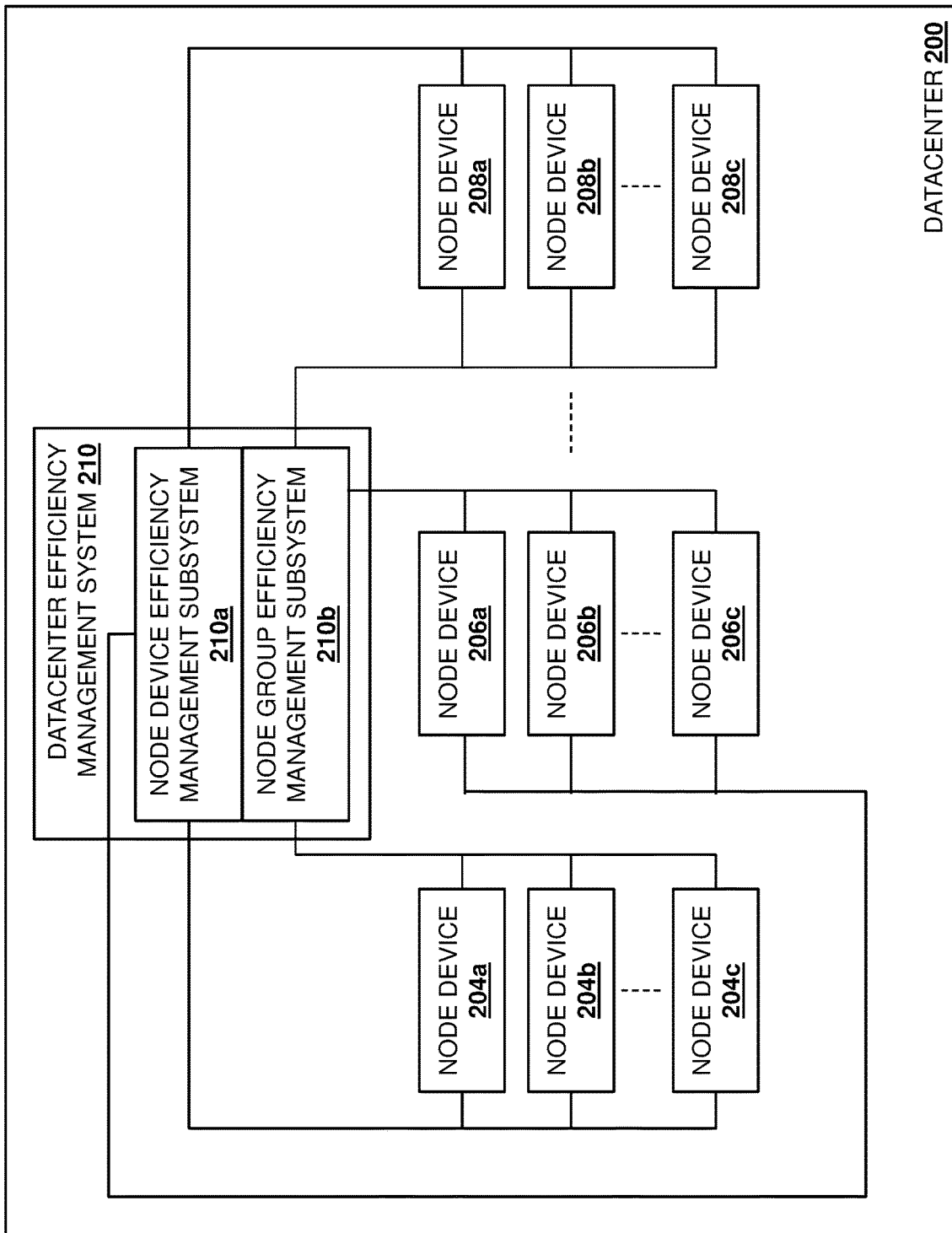
FIG. 2 is a schematic view illustrating an embodiment of a datacenter.

Referring now to FIG. 2, an embodiment of a datacenter 200 is illustrated. In the illustrated embodiment, the datacenter 200 includes a plurality of node devices 204a, 204b, and up to 204c; a plurality of node devices 206a, 206b, and up to 206c; and a plurality of node devices 208a, 208b, and up to 208c. In an embodiment, any or each of the node devices 204a-204c, 206a-206c, and 208a-208c may be provided by the IHS 100 discussed above with reference to FIG. 1, and/or may include some or all of the components of the IHS 100, and in specific examples may each be provided by server devices. However, while illustrated and discussed as being provided by server devices, one of skill in the art in possession of the present disclosure will recognize that node devices provided in the datacenter 200 may include any devices (e.g., networking devices, storage systems, etc.) that may be configured to operate similarly as the node devices 204a-204c, 206a-206c, and 208a-208c discussed below. Furthermore, while the node devices 204a-204c are illustrated and described below as being grouped together, the node devices 206a-206c are illustrated and described below as being grouped together, and the node devices 208a-208c are illustrated and described below as being grouped together, one of skill in the art in possession of the present disclosure will appreciate how node devices may be grouped in different manners than illustrated and described herein while remaining within the scope of the present disclosure as well.

In the illustrated embodiment, the datacenter 200 also include a datacenter efficiency management system 210 that is discussed below as including a node device efficiency management subsystem 210a and a node group efficiency management subsystem 210b. In a specific example, the node device efficiency management subsystem 210a may be provided by a management console that has been enhanced or otherwise configured to perform the node device efficiency management functionality discussed below, while the node group efficiency management subsystem 210b may be provided by a cluster manager that has been enhanced or otherwise configured to perform the node group efficiency management functionality discussed below. However, while the functionality of the datacenter efficiency management system 210 is illustrated and described as being provided by two distinct subsystems (e.g., a management console and a cluster manager in the specific example above), one of skill in the art in possession of the present disclosure will recognize that the datacenter efficiency management functionality described herein may be provided by a single device/system while remaining within the scope of the present disclosure as well. Furthermore, while a specific datacenter 200 has been illustrated and described, one of skill in the art in possession of the present disclosure will recognize that the datacenter efficiency management system of the present disclosure may include a variety of components and component configurations while remaining within the scope of the present disclosure as well. For example, one of skill in the art in possession of the present disclosure will appreciate that the "datacenter" described herein may be provided by any multi-node-device system that deploys workloads on node devices.

Figure 3:
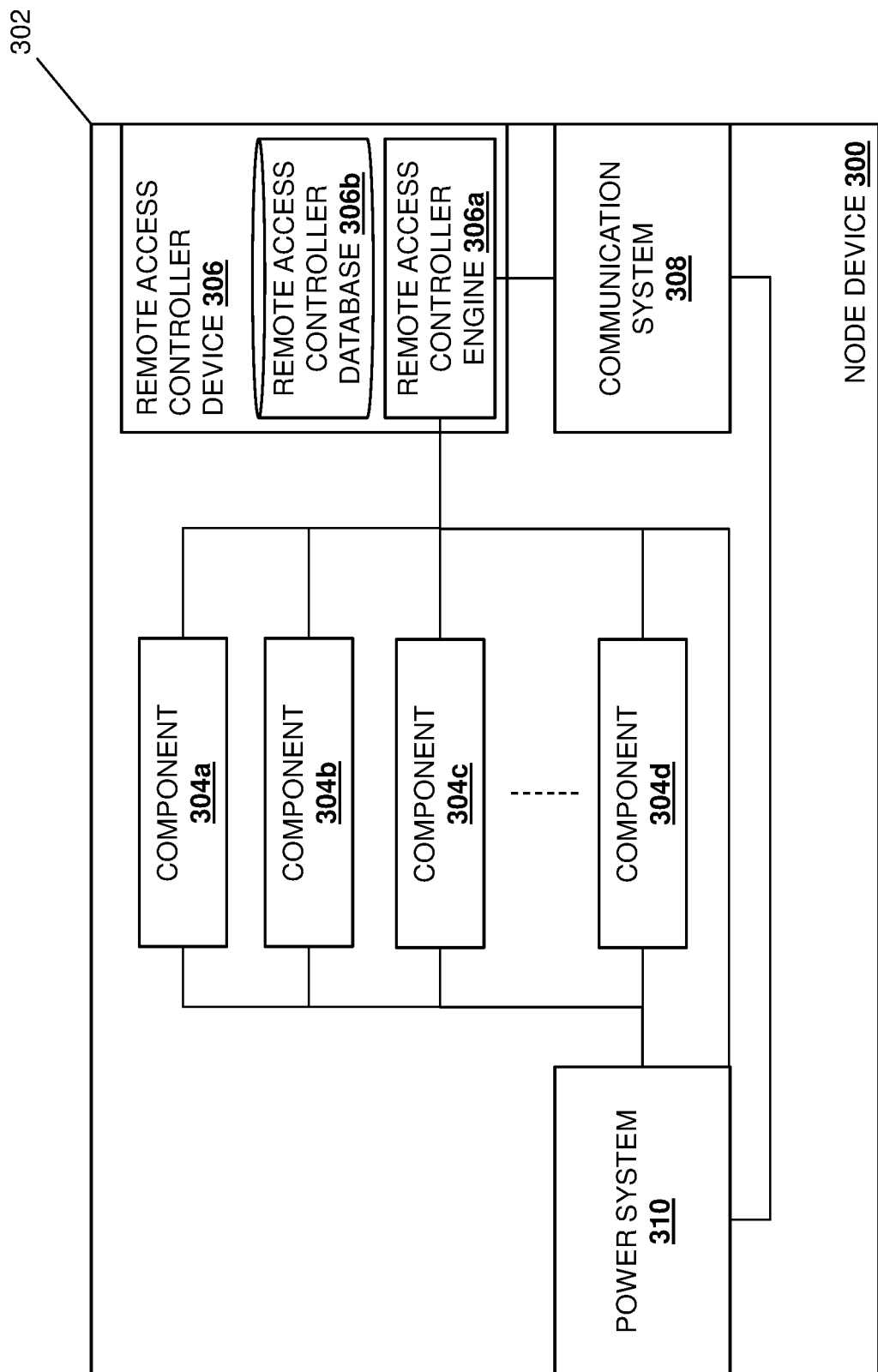
FIG. 3 is a schematic view illustrating an embodiment of a node device that may be included in the datacenter of FIG. 2.

Referring now to FIG. 3, an embodiment of a node device 300 is illustrated that may provide any or each of the node devices 204a-204c, 206a-206c, and 208a-208c discussed above with reference to FIG. 2. As such, the node device 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the node device 300 discussed below may be provided by other devices (e.g., networking devices, storage systems, etc.) that are configured to operate similarly as the node device 300 discussed below. In the illustrated embodiment, the node device 300 includes a chassis 302 that houses the components of the node device 300, only some of which are illustrated and discussed below.

For example, the chassis 302 may house a plurality of components 304a, 304b, 304c, and up to 304d. In specific examples, the components 304a-304d may be provided by processing systems, memory systems, and/or any other hardware components that would be apparent to one of skill in the art in possession of the present disclosure. The chassis 302 may also house a remote access controller device 306 that may be provided by an integrated DELL® Remote Access Controller (iDRAC) available in server devices provided by DELL® Inc. of Round Rock, Texas, United States; a Baseboard Management Controller (BMC), and/or other remote access controller devices known in the art. In the illustrated embodiment, the remote access controller device includes a remote access controller processing system (not illustrated, but which may include the processor 102 discussed above with reference to FIG. 1) and a remote access controller memory system (not illustrated, but which may include the memory 114 discussed above with reference to FIG. 1) that is coupled to the remote access controller processing system and that includes instructions that, when executed by the remote access controller processing system, cause the remote access controller processing system to provide a remote access controller engine 306a that is configured to perform the functionality of the remote access controller engines and/or remote access controller devices discussed below.

The remote access controller device 306 may also include a remote access controller storage system (not illustrated, but which may include the storage 108 discussed above with reference to FIG. 1) that is coupled to the remote access controller engine 306a (e.g., via a coupling between the remote access controller storage system and the remote access controller processing system) and that includes a remote access controller database 306b that is configured to store any of the information utilized by the remote access controller engine 306a discussed below. However, while illustrated and discussed as being provided by a remote access controller device, one of skill in the art in possession of the present disclosure will recognize that the functionality of the node devices discussed below may be performed by other node device subsystems while remaining within the scope of the present disclosure as well.

The chassis 302 may also house a communication system 308 that is coupled to the remote access controller engine 306a in the remote access controller device 306 (e.g., via a coupling between the communication system 308 and the remote access controller processing system) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. The chassis 302 may also house a power system 310 that may be provided by a Power Supply Unit (PSU) and/or other power system components known in the art, and that is coupled to each of the components 304a-304d, the remote access controller engine 306a in the remote access controller device 306, and the communication system 308. However, while a specific node device 300 has been illustrated, one of skill in the art in possession of the present disclosure will recognize that node devices (or other devices operating according to the teachings of the present disclosure in a manner similar to that described below for the node device 300) may include a variety of components and/or component configurations for providing conventional node device functionality, as well as the functionality discussed below, while remaining within the scope of the present disclosure as well.

Figure 4:
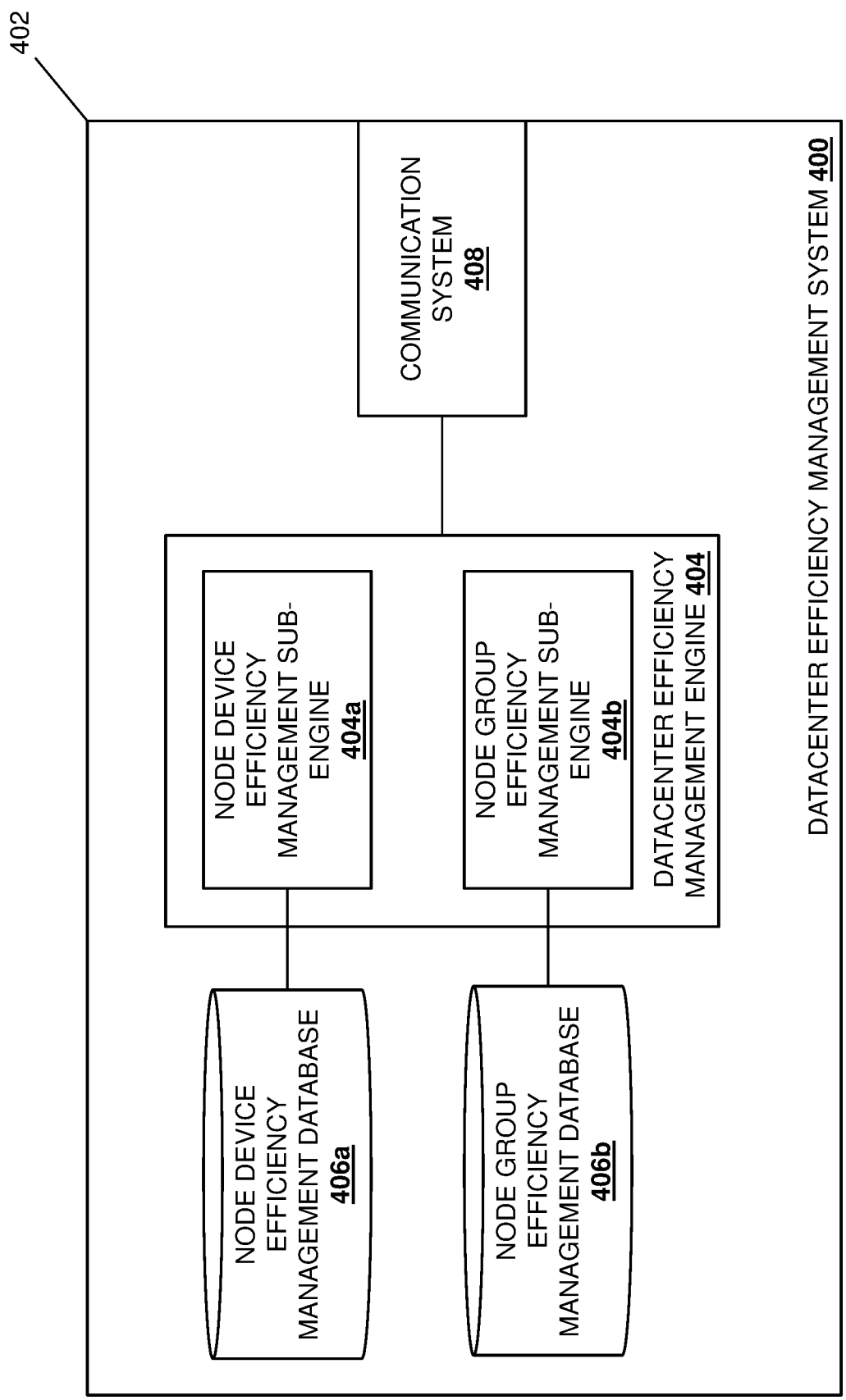
FIG. 4 is a schematic view illustrating an embodiment of a datacenter efficiency management system that may be included in the datacenter of FIG. 2.

Referring now to FIG. 4, an embodiment of a datacenter efficiency management system 400 is illustrated that may provide the datacenter efficiency management system 210 discussed above with reference to FIG. 2. In the illustrated embodiment, the datacenter efficiency management system 400 includes a chassis 402 that includes the components of the datacenter efficiency management system 400, only some of which are illustrated and discussed below. For example, the chassis 402 may house a datacenter efficiency management processing system (not illustrated, but which may include the processor 102 discussed above with reference to FIG. 1) and a datacenter efficiency management memory system (not illustrated, but which may include the memory 114 discussed above with reference to FIG. 1) that is coupled to the datacenter efficiency management processing system and that includes instructions that, when executed by the datacenter efficiency management processing system, cause the datacenter efficiency management processing system to provide a datacenter efficiency management engine 404 that is configured to perform the functionality of the datacenter efficiency management engines and/or datacenter efficiency management systems discussed below.

Similarly as discussed above, the datacenter efficiency management engine 304 is illustrated and described as including a node device efficiency management sub-engine 404a and a node group efficiency management sub-engine 404b. In a specific example, the node device efficiency management sub-engine 404a may be provided by a management console engine in a management console that has been enhanced or otherwise configured to perform the node device efficiency management functionality discussed below, while the node group efficiency management sub-engine 404b may be provided by a cluster manager engine in a customer manager that has been enhanced or otherwise configured to perform the node group efficiency management functionality discussed below. However, while the functionality of the datacenter efficiency management engine 404 is illustrated and described as being provided by two distinct sub-engines (e.g., a management console engine and a cluster manager engine in the specific example above), one of skill in the art in possession of the present disclosure will recognize that the datacenter efficiency management functionality described herein may be provided by a single engine while remaining within the scope of the present disclosure as well The chassis 402 may also house a datacenter efficiency management storage system (not illustrated, but which may include the storage 108 discussed above with reference to FIG. 1) that is coupled to the datacenter efficiency management engine 404 (e.g., via a coupling between the datacenter efficiency management storage system and the datacenter efficiency management processing system) and that includes a node device efficiency management database 406a that is configured to store any of the information utilized by the node device efficiency management sub-engine 404a discussed below, and a node group efficiency management database 406b that is configured to store any of the information utilized by the node group efficiency management sub-engine 404b discussed below. The chassis 402 may also house a communication system 408 that is coupled to the datacenter efficiency management engine 404 (e.g., via a coupling between the communication system 308 and the datacenter efficiency management processing system) and that may include any communication components that one of skill in the art in possession of the present disclosure that would recognize as providing the communication connections described below. However, while a specific datacenter efficiency management system 400 has been illustrated and described, one of skill in the art in possession of the present disclosure will recognize that datacenter efficiency management system (or other devices operating according to the teachings of the present disclosure in a manner similar to that described below for the datacenter efficiency management system 400) may include a variety of components and/or component configurations for providing conventional functionality, as well as the functionality discussed below, while remaining within the scope of the present disclosure as well.

Figure 5:
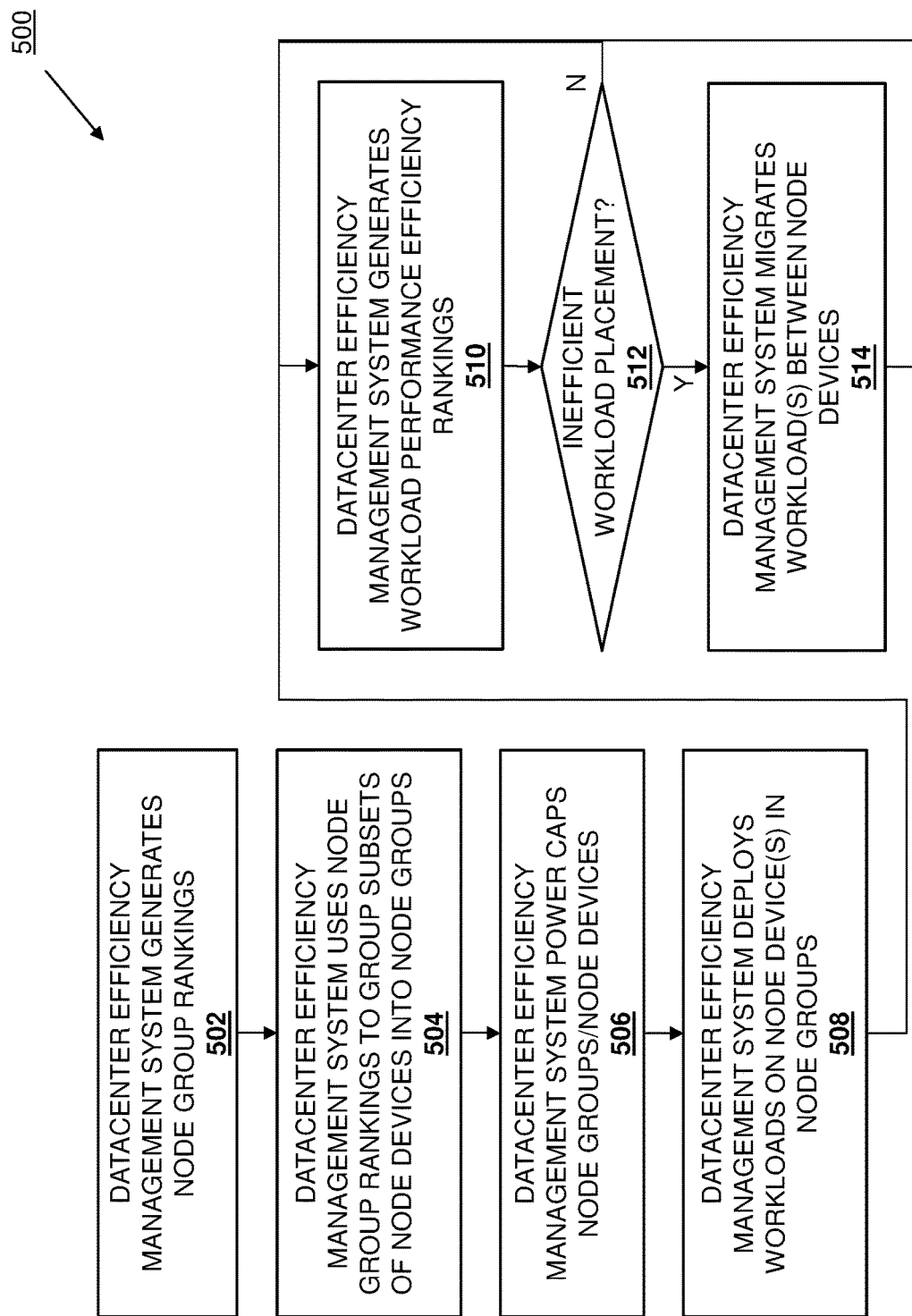
FIG. 5 is a flow chart illustrating an embodiment of a method for managing datacenter efficiency.

Referring now to FIG. 5, an embodiment of a method 500 for managing datacenter efficiency is illustrated. As discussed below, the systems and methods of the present disclosure provide for the efficient management of node devices in homogeneous node groups and workload placement in a datacenter in a manner that attempts to optimize power consumption by the datacenter while ensuring that workload performance requirements (e.g., Service Level Agreements (SLAs)) are met. For example, a datacenter may include a datacenter efficiency management system coupled to node devices. For each of the node devices and based on a power consumption associated with that node device and a performance associated with that node device, the datacenter efficiency management system generates a node group ranking that it uses to group subsets of the node devices into respective homogenous node groups, and then deploys a respective workload on at least one node device in each of the homogenous node groups. Based on at least one of a node workload bandwidth, a node power consumption, and a node health of each node device on which a workload was deployed, the datacenter efficiency management system then generates a workload performance efficiency ranking of the node devices that it then uses to migrate at least one workload between the node devices. As such, workloads may be deployed on and/or migrated to node devices that will perform them in the most power-efficient manner, thus reducing the costs of operating the datacenter.

Figure 6A:
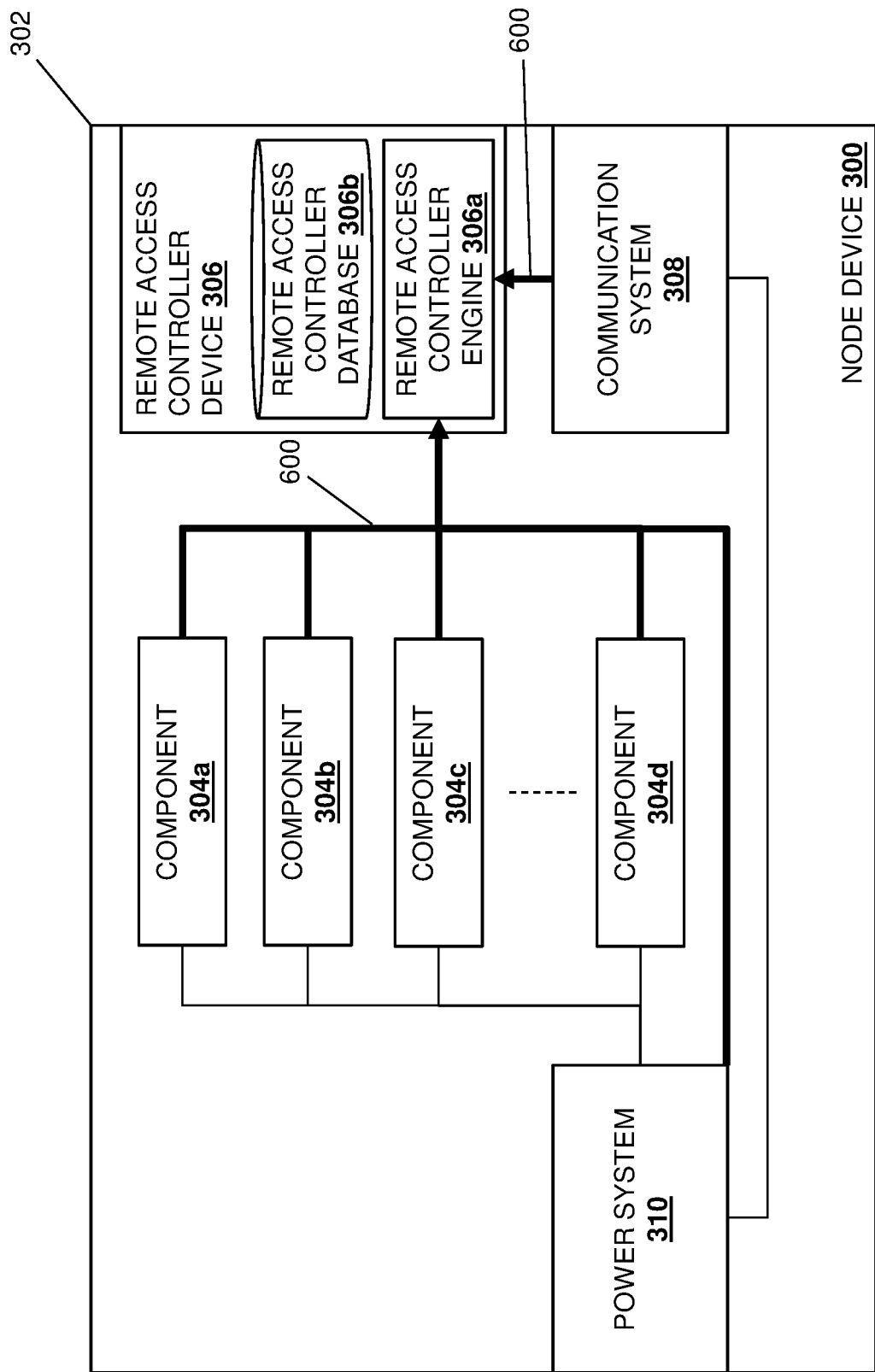
FIG. 6A is a schematic view illustrating an embodiment of the node device of FIG. 3 operating during the method of FIG. 5.

The method 500 begins at block 502 where a datacenter efficiency management system generates node group rankings. As illustrated in FIG. 6A, in an embodiment and during or before block 502, the remote access controller engine 306a in the remote access controller device 306 in each node device 204a-204c/300, 206a-206c/300, and 208a-208c/300 may perform inventory information retrieval operations 600 that include retrieving inventory information from the node device 300 in which it is located by, for example, retrieving inventory information from each of the components 304a-304d, the communication system 308, the power system 310, and/or any other components, systems, and devices that are included in the node device 300. As will be appreciated by one of skill in the art in possession of the present disclosure, while the inventory information is illustrated and discussed as being retrieved by the remote access controller device 306 during or prior to the method 500, in other embodiments at least some of that inventory information may have been previously stored in the remote access controller database 306b.

In a specific example, the inventory information retrieved by the remote access controller device 306 at block 502 may include processing system information about a processing system in the node device 300, memory system information about a memory system in the node device 300, power system information about the power system 310 in the node device 300, networking system information about a networking system (e.g., the communication system 308) in the node device 300, and/or other hardware information about other hardware in the node device 300; firmware information (e.g., firmware versions and/or other firmware information known in the art) about firmware utilized with the components, systems, and devices that are included in the node device 300; node device power capacity information (e.g., a minimum power required, a maximum power that may be consumed, etc.) about the node device 300, and/or any other inventory information that one of skill in the art in possession of the present disclosure would recognize as enabling the functionality discussed below. As such, one of skill in the art in possession of the present disclosure will appreciate that a variety of inventory information may be retrieved by the remote access controller device 306 at block 502 while remaining within the scope of the present disclosure.

Figure 6B:
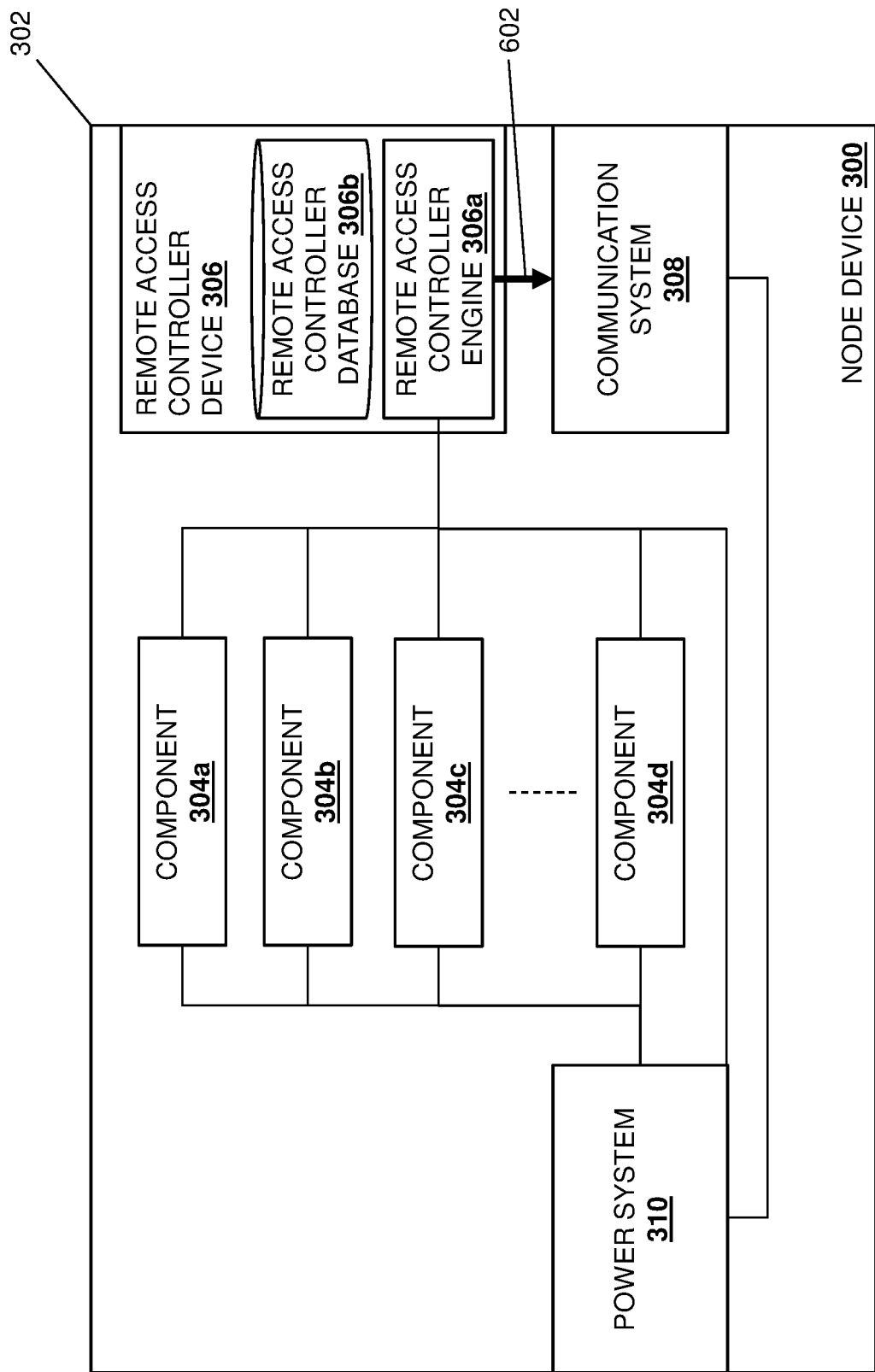
FIG. 6B is a schematic view illustrating an embodiment of the node device of FIG. 3 operating during the method of FIG. 5.
Figure 6C:
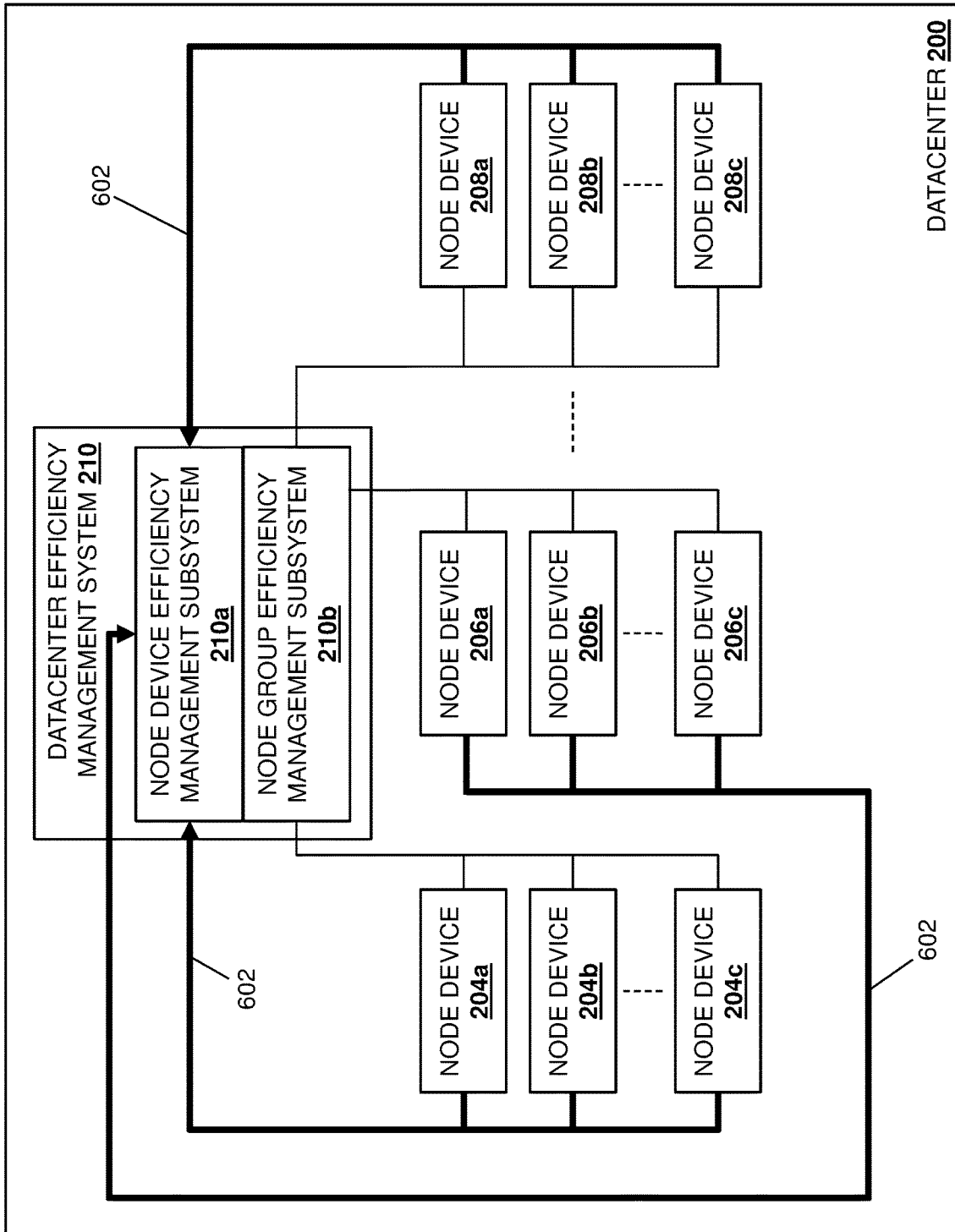
FIG. 6C is a schematic view illustrating an embodiment of the datacenter of FIG. 2 operating during the method of FIG. 5.

At block 502, the remote access controller engine 306a in the remote access controller device 306 in each node device 204a-204c/300, 206a-206c/300, and 208a-208c/300 may generate an inventory for the node device 300 in which it is located using the inventory information, and one of skill in the art in possession of the present disclosure will appreciate how any node device inventory that is generated at block 502 may structure the inventory information in a manner that may be consumed by the datacenter efficiency management system 210 to enable the functionality discussed below. Furthermore, while the inventory is discussed as being generated by the remote access controller device 306 during or prior to the method 500, in other embodiments at least some of that inventory may have been previously generated and stored in the remote access controller database 306b. With reference to FIGS. 6B and 6C, the remote access controller engine 306a in the remote access controller device 306 in each node device 204a-204c/300, 206a-206c/300, and 208a-208c/300 may then perform inventory transmission operations 602 via the communication system 308 in that node device 300 and to the node device efficiency management subsystem 210a in the datacenter efficiency management system 210. As such, at block 502, the datacenter efficiency management system 210 may receive an inventory for each of the node devices 204a-204c, 206a-206c, and 208a-208c, and one of skill in the art in possession of the present disclosure will appreciate how the inventory for each of the node devices 204a-204c, 206a-206c, and 208a-208c may be utilized below to estimate the power that node device will consume during operations (e.g., particular systems, devices, or components may be known to consume particular power amounts that may be used to generate such estimates).

In response to receiving the inventory for each of the node devices 204a-204c, 206a-206c, and 208a-208c (e.g., via the communication system 408 in the datacenter efficiency management system 210/400), the node device efficiency management sub-engine 404a in the datacenter efficiency management engine 404 of the datacenter efficiency management system 210/400 may utilize those inventories to generate node group rankings. In some embodiments, the generation of the node group rankings at block 502 may include the node device efficiency management sub-engine 404a retrieving a vendor specification for each of the node devices 204a-204c, 206a-206c, and 208a-208c from the node device efficiency management database 406a, vendor performance test metrics for each of the node devices 204a-204c, 206a-206c, and 208a-208c from the node device efficiency management database 406a, as well as any other information that one of skill in the art in possession of the present disclosure would appreciate as allowing for the node group rankings described below. As will be appreciated by one of skill in the art in possession of the present disclosure, vendor specifications for a node device may identify how that node device is specified to consume power (as well as a variety of other vendor specification information known in the art), and vendor performance test metrics for a node device may identify how that node device has performed during testing, and thus the retrieval of the vendor information from the node device efficiency management database 406a may provide the node device efficiency management sub-engine 404a any of a variety of power consumption and performance information for each of the node devices 204a-204c, 206a-206c, and 208a-208c.

In a specific example, vendor specifications may identify relationships between any particular classes of node device (e.g., the one processor socket server device class, two processor socket server device class, high-end server device classes, and mid-range server device class in the example provided below) and their power consumption, airflow capabilities, and performance efficiency. The table below provide an example of such relationships, although one of skill in the art in possession of the present disclosure will appreciate how other relationships may be identified by vendor specifications while remaining within the scope of the present disclosure as well:

| Server class | Power Consumption (%) | CFM | Performance Efficiency (%) |
| --- | --- | --- | --- |
| 1 socket servers - Generation 1 | 100 | 55 | 55 |
| 1 socket servers - Generation 2 | 100 | 55 | 65 |
| 2 socket servers - Generation 1 | 100 | 55 | 75 |
| 2 socket servers - Generation 2 | 100 | 55 | 85 |
| High End - Generation 1 | 100 | 55 | 80 |
| High End - Generation 2 | 100 | 55 | 90 |
| Mid-Range - Generation 1 | 100 | 55 | 50 |
| Mid-Range - Generation 2 | 100 | 55 | 60 |

As would be appreciated by one of skill in the art in possession of the present disclosure, the table above illustrates how different server device classes consuming the same power and receiving the same cooling level may operate at different performance efficiencies across different generations, and one of skill in the art in possession of the present disclosure will recognize how this information may be utilized in the method 500 to create the homogenous node groups described herein.

As such, the node device efficiency management sub-engine 404a in the datacenter efficiency management engine 404 of the datacenter efficiency management system 210/400 may utilize the inventories and the vendor specifications for each of the node devices 204a-204c, 206a-206c, and 208a-208c to estimate a power that each of those nodes devices will consume during operations, and may utilize the vendor performance test metrics for each of the node devices 204a-204c, 206a-206c, and 208a-208c to estimate how each of those nodes devices will perform during those operations, and then may use those power consumption and performance estimates to generate a node group ranking for each of the node devices 204a-204c, 206a-206c, and 208a-208c that ranks those node devices relative to each other based on their estimated power consumption and performance during operations.

In a specific example, the node group rankings may allow the node devices 204a-204c, 206a-206c, and 208a-208c to be grouped into homogenous node groups that include node devices of the same class (e.g., the server classes discussed above) in order to provide a relatively high performance/low power consumption homogenous node group, a relatively high performance/high power consumption homogenous node group, a relatively low performance/low power consumption homogenous node group, and a relatively low performance/high power consumption homogenous node group. However, while particular homogenous node groups are described, one of skill in the art in possession of the present disclosure will appreciate that the homogenous node groups may be defined in other manners (e.g., an intermediate performance/intermediate power consumption homogenous node group, etc.) while remaining within the scope of the present disclosure. As such, the node group rankings may (also, or instead) be generated based on a generation and class of each of the node devices 204a-204c, 206a-206c, and 208a-208c. As detailed in the table above and as will be appreciated by one of skill in the art in possession of the present disclosure, more recent generation node devices in any particular class (e.g., $12^{th}$ generation server devices) will generally have relatively higher performance and lower power consumption (e.g., due to their relatively higher performance/lower power consumption chipsets) than later generation node devices in that particular classes (e.g., $11^{th}$ generation server devices), while different classes of node devices within a generation will have different performance/power consumption characteristics.

Figure 7:
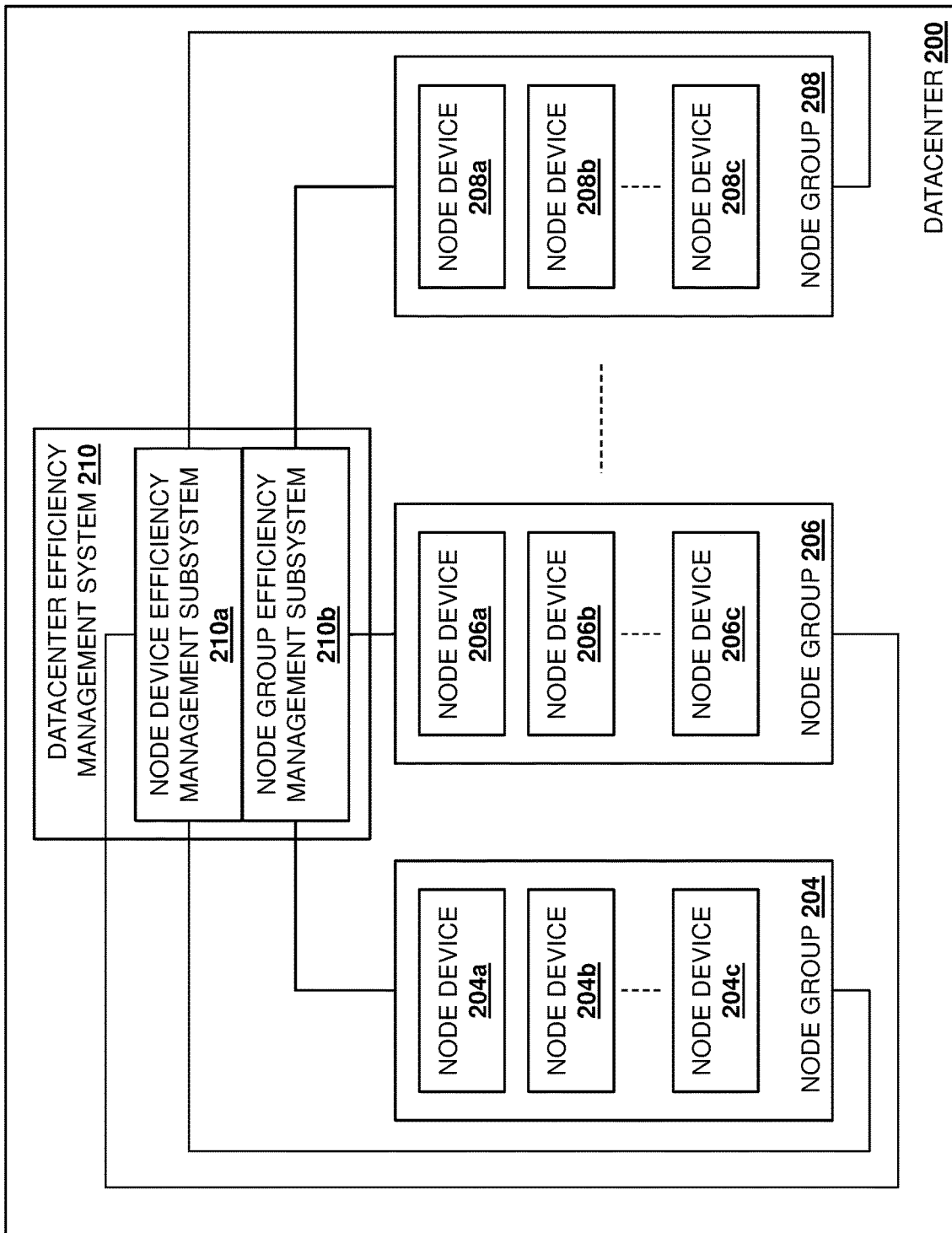
FIG. 7 is a schematic view illustrating an embodiment of the datacenter of FIG. 2 operating during the method of FIG. 5.

The method 500 then proceeds to block 504 where the datacenter efficiency management system uses the node group rankings to group subsets of node devices into homogenous node groups. In an embodiment, at block 504, the node device efficiency management subsystem 210a in the datacenter efficiency management system 210 may provide the node group rankings generated at block 502 to the node group efficiency management subsystem 210b in the datacenter efficiency management system 210, and the node group efficiency management subsystem 210b may then use the node group rankings to group subsets of the node devices 204a-204c, 206a-206c, and 208a-208c into homogenous node groups. For example, with reference to FIG. 7, the node group efficiency management sub-engine 404b in the datacenter efficiency management engine 404 may have received the node group rankings from the node device efficiency management sub-engine 404a in the datacenter efficiency management engine 404 and, in response, the node group efficiency management sub-engine 404b may have grouped the node devices 204a-204c into a homogenous node group 204, the node devices 206a-206c into a homogenous node group 206, and up to the node devices 208a-208c into a homogenous node group 208.

Continuing with the specific example discussed above, the homogenous node group 204 may include node devices of a first class (and possibly different generations) and may be a relatively high performance/low power consumption node group, the node group 206 may include node devices of the first class (and possibly different generations) and may be a relatively high performance/high power consumption node group, and the node group 208 may include node devices of the first class (and possibly different generations) and may be a relatively low performance/low power consumption node group. In another specific example, the homogenous node group 204 may include node devices of a first class (and possibly different generations) and may be a relatively high performance/low power consumption node group, the node group 206 may include node devices of a second class (and possibly different generations) and may be a relatively high performance/high power consumption node group, and the node group 208 may include node devices of a third class (and possibly different generations) and may be a relatively low performance/low power consumption node group. However, while specific examples have been provided, other homogenous node groupings will fall within the scope of the present disclosure as well, and one of skill in the art in possession of the present disclosure will appreciate how homogenous node groupings in a datacenter may be generated depending on whether performance or power efficiency is prioritized in that datacenter.

As such, following block 504, the node devices 204a-204c, 206a-206c, and 208a-208c have been grouped in the datacenter 200 based on their inventories, vendor specifications, and vendor performance test metrics such that each node device in a subset of node devices that provide a particular homogenous node group includes node devices of a particular class with performance characteristics that fall within a particular performance range (e.g., high performance, low performance, etc.) and power consumption characteristics that fall within a particular power consumption range (e.g., high power consumption, low power consumption, etc.) As will be appreciated by one of skill in the art in possession of the present disclosure and as discussed below, the use of inventories, vendor specifications, and vendor performance test metrics for node devices allows for the intelligent initial placement of workloads on those node devices, but in some cases may not accurately reflect the performance and/or power consumption of that node device during its actual operation.

The method 500 then proceeds to block 506 where the datacenter efficiency management system power caps node groups/node devices. In an embodiment, at block 506, the node group efficiency management subsystem 210b in the datacenter efficiency management system 210/400 may operate with the remote access controller device 306 in each node device 300 to power cap the homogenous node groups 204, 206, and up to 208. For example, at block 506 the node group efficiency management subsystem 210b may identify a total power that is allocated, available, or otherwise provided to the datacenter 200 (e.g., as defined by a datacenter administrator or other user, or as available via other techniques that would be apparent to one of skill in the art in possession of the present disclosure), and may then may operate with the remote access controller device 306 in each node device 300 to provide power caps for each of the homogenous node groups 204, 206, and up to 208 based on that total power and the node group rankings of the node devices in those homogenous node groups. For example, for the homogenous node group 204 that is described as being a relatively high performance/low power consumption homogenous node group, at block 506 the node group efficiency management subsystem 210b may generate a power cap for that homogenous node group 204 that is configured to power the homogenous node group 204 at a level that allows the node devices 204a-204c in that homogenous node group 204 to provide that high performance while also recognizing the power efficiency of those node devices 204a-204c.

As such, one of skill in the art in possession of the present disclosure will appreciate how the total power available to the datacenter 200 may be divided up between the homogenous node groups 204, 206, and up to 208 to allow the node devices in those homogenous node groups to operate within their performance range and power efficiency range for their homogenous node group. Furthermore, while power capping at a node group level is described as being performed at block 506, one of skill in the art in possession of the present disclosure will appreciate how such power capping may be modified and/or continue throughout the method 500. Further still, as discussed below, power capping of node devices within the homogenous node groups 204, 206, and up to 208 may be performed during the method 500 while remaining within the scope of the present disclosure as well.

Figure 8:
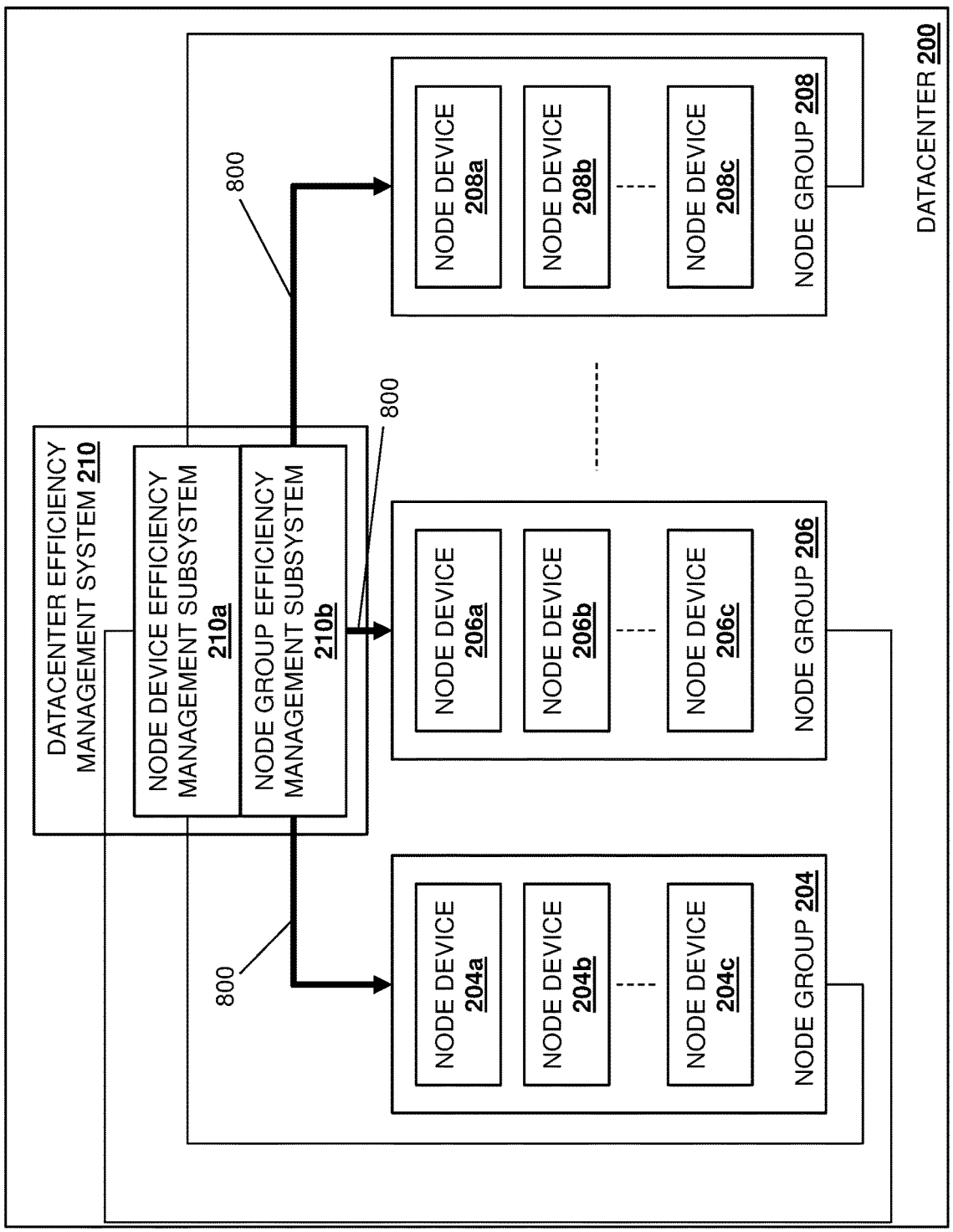
FIG. 8 is a schematic view illustrating an embodiment of the datacenter of FIG. 2 operating during the method of FIG. 5.

The method 500 then proceeds to block 508 where the datacenter efficiency management system deploys workloads on one or more node devices in each of the homogenous node groups. With reference to FIG. 8, in an embodiment of block 508, the node group efficiency management subsystem 210b in the datacenter efficiency management system 210 may perform workload deployment operations 800 to deploy workloads on any of the node devices 204a-204c in the homogenous node group 204, the node devices 206a-206c in the homogenous node group 206, and the node devices 208a-208c in the homogenous node group 208. As will be appreciated by one of skill in the art in possession of the present disclosure, any of a variety of techniques may be utilized to provide the node group efficiency management subsystem 210b with workloads for deployment in the datacenter 200, and the node group efficiency management subsystem 210b may then identify workload performance characteristics of any particular workload that has been provided for deployment, and then deploy that workload in a homogenous node group based on the performance range of that homogenous node group and the workload performance characteristics of that workload. One of skill in the art in possession of the present disclosure will recognize how workloads may be characterized (e.g., compute-intense workloads, networking-intense workloads, storage-intense workloads, graphics-intense workloads, accelerator-intense workloads, etc.) to identify a performance range needed to provide that workload (e.g., a performance range guaranteed in a Service Level Agreement (SLA) with the user of that workload, a performance range needed to provide for proper operation of that workload, etc.), and thus the node group efficiency management subsystem 210b may match workloads with homogenous node groups based on performance required/guaranteed for those workloads and performance capabilities of those homogenous node groups.

As such, continuing with the specific example above, relatively high performance workloads may be deployed on the node devices 204a-204c in the homogenous node group 204 that is a high performance/low power consumption homogenous node group such that relatively high performance workload(s) are deployed on any one of those node devices up to an optimal performance/power efficiency threshold, followed by high performance workload(s) being deployed on another of those node devices up to an optimal performance/power efficiency threshold, and so on until all of the relatively high performance workloads have been deployed, or all of the node devices 204a-204c in the homogenous node group 204 have been deployed workloads up to their optimal performance/power efficiency threshold. Similarly, continuing with the specific example above, relatively high performance workloads may be deployed on the node devices 206a-206c in the homogenous node group 206 that is a high performance/high power consumption homogenous node group such that relatively high performance workload(s) are deployed on any one of those node devices up to an optimal performance/power efficiency threshold, followed by high performance workload(s) being deployed on another of those node devices up to an optimal performance/power efficiency threshold, and so on until all of the relatively high performance workloads have been deployed, or all of the node devices 206a-206c in the homogenous node group 206 have been deployed workloads up to their optimal performance/power efficiency threshold.

Similarly, continuing with the specific example above, relatively low performance workloads may be deployed on the node devices 208a-208c in the homogenous node group 208 that is a low performance/low power consumption homogenous node group such that relatively low performance workload(s) are deployed on any one of those node devices up to an optimal performance/power efficiency threshold, followed by low performance workload(s) being deployed on another of those node devices up to an optimal performance/power efficiency threshold, and so on until all of the relatively low performance workloads have been deployed, or all of the node devices 208a-208c in the homogenous node group 208 have been deployed workloads up to their optimal performance/power efficiency threshold. As such, while a specific example of workload deployment has been described, one of skill in the art in possession of the present disclosure will appreciate how workloads may be initially deployed on node devices in the homogenous node groups 204, 206, and up to 208 in a variety of manners (e.g., depending on whether performance or power efficiency is prioritized) while remaining within the scope of the present disclosure as well.

The method 500 then proceeds to block 510 where the datacenter efficiency management system generates workload performance efficiency rankings. With reference to FIG. 6A, in an embodiment of block 510 and during the performance of workload(s) by each node device 204a-204c/300, 206a-206c/300, and 208a-208c/300, the power system 310 in that node device 300 will perform power provisioning operations 900 in order to provide power to each of the components 304a-304d, the communication system 308, as well as any other systems, components, and devices in that node device 300. With continued reference to FIG. 6A, in an embodiment of block 510, the remote access controller engine 306a in the remote access controller device 306 in each node device 204a-204c/300, 206a-206c/300, and 208a-208c/300 may perform operating information retrieval operations 902 that include retrieving operating information from the node device 300 in which it is located by, for example, retrieving operating information from each of the components 304a-304d, the communication system 308, the power system 310, and/or any other components, systems, and devices that are included in the node device 300. As will be appreciated by one of skill in the art in possession of the present disclosure, the operating information retrieved by the remote access controller device 306 at block 510 may include telemetry information that identifies the loading/bandwidth of the components 304a-304d and the communication system 308, the power consumption of the components 304a-304d and the communication system 308, the health of the components 304a-304d and the communication system 308, and/or any other operational information that would be apparent to one of skill in the art in possession of the present disclosure.

Figure 9A:
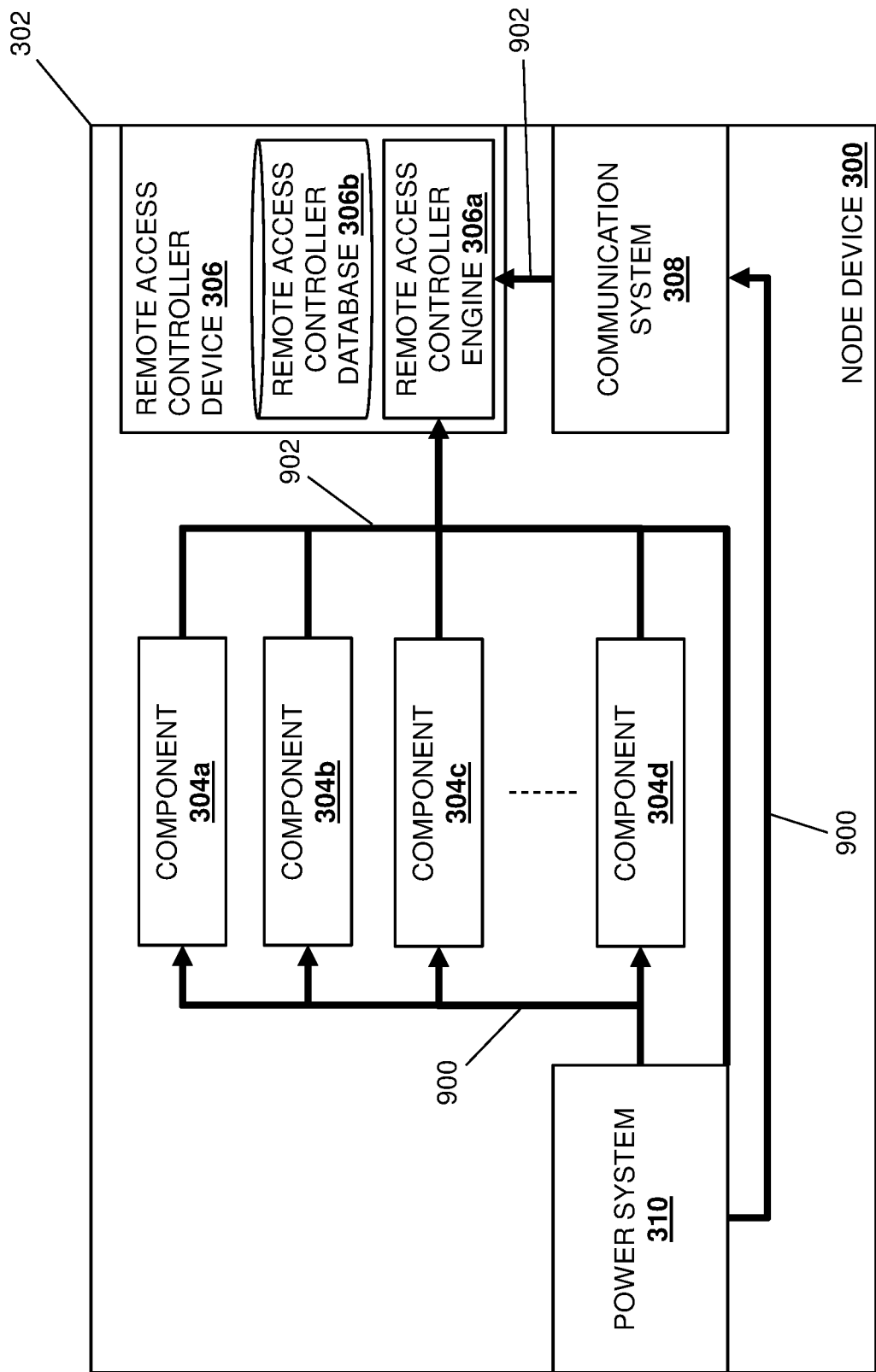
FIG. 9A is a schematic view illustrating an embodiment of the node device of FIG. 3 operating during the method of FIG. 5.
Figure 9B:
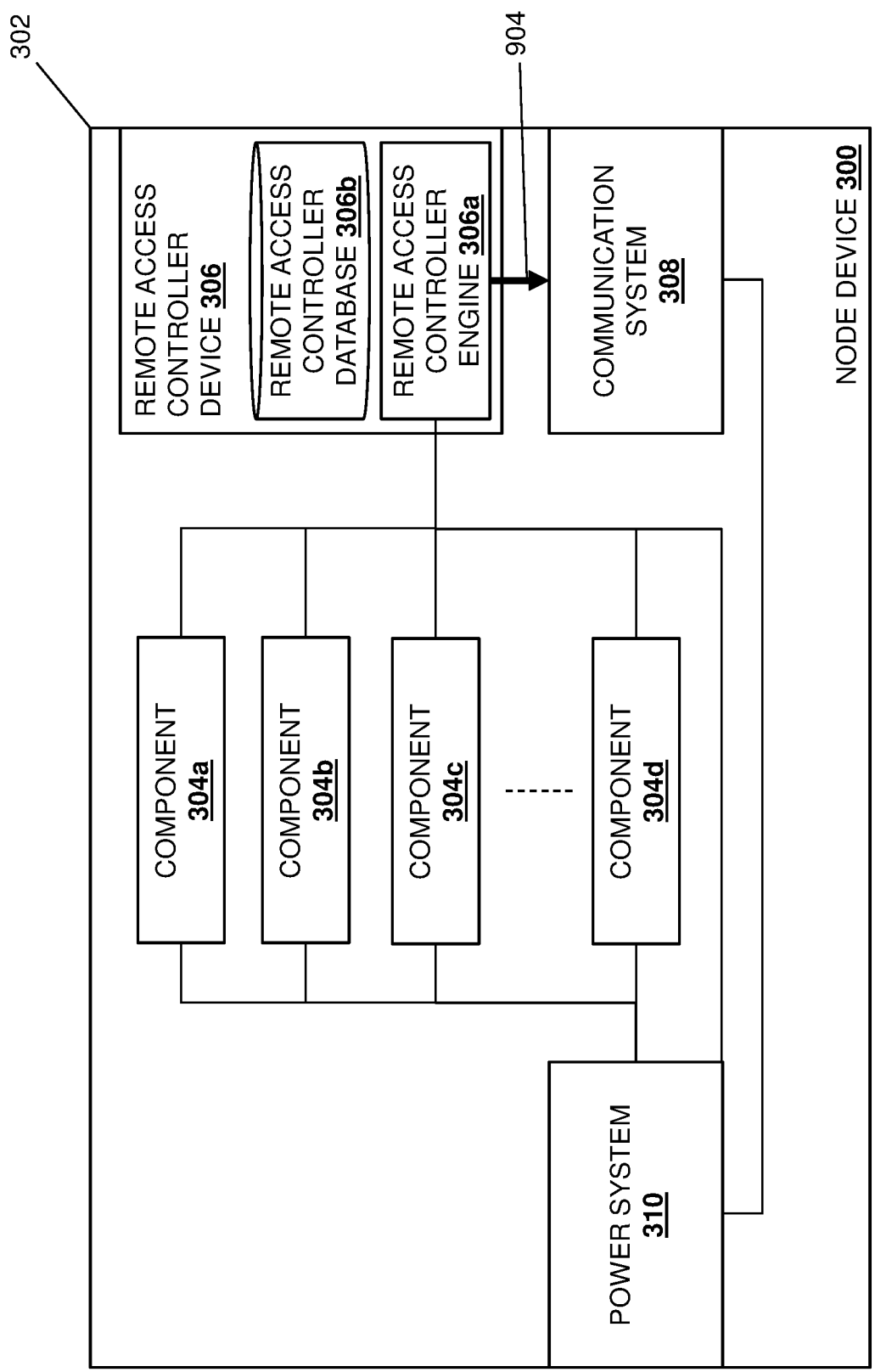
FIG. 9B is a schematic view illustrating an embodiment of the node device of FIG. 3 operating during the method of FIG. 5.
Figure 9C:
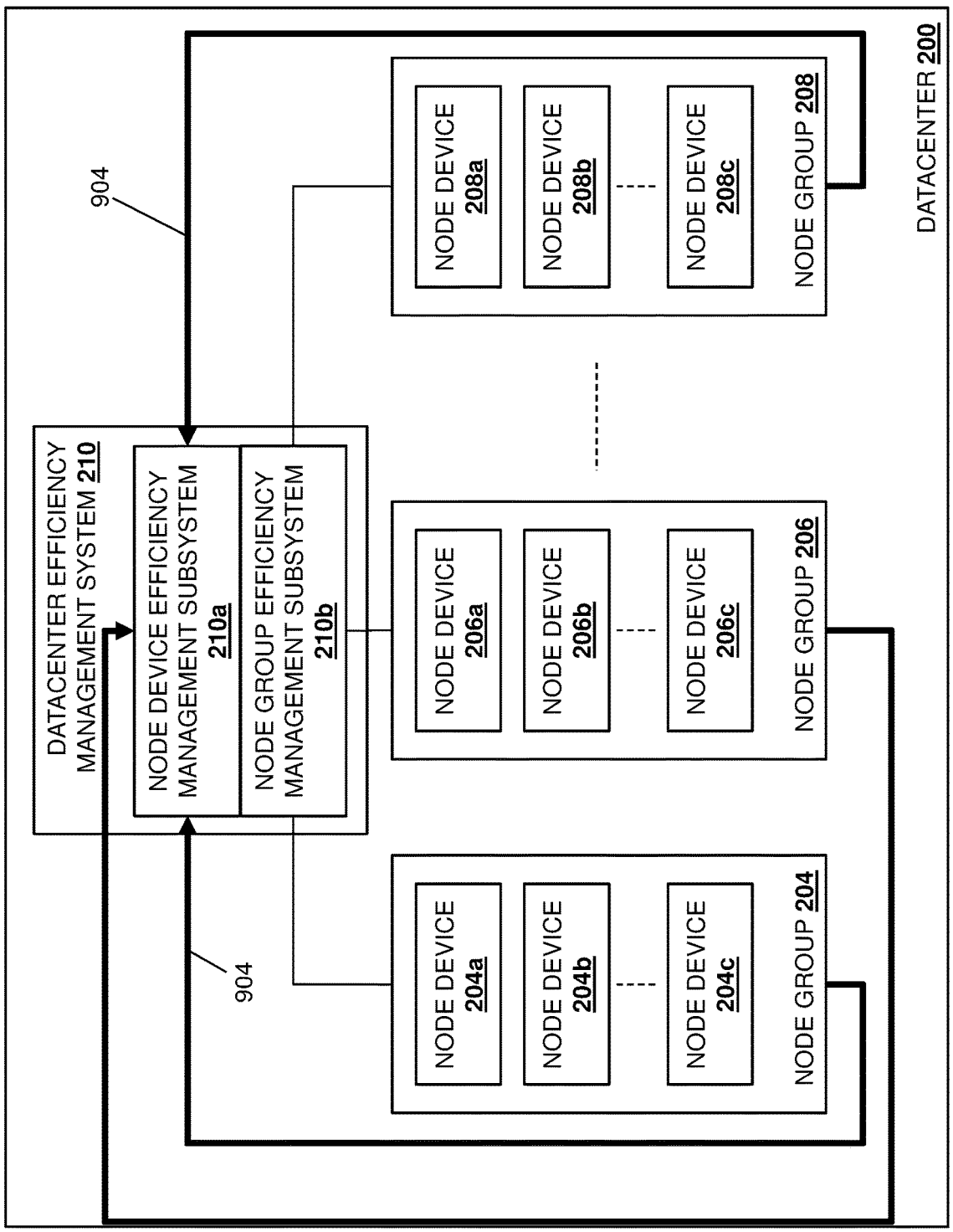
FIG. 9C is a schematic view illustrating an embodiment of the datacenter of FIG. 2 operating during the method of FIG. 5.

With reference to FIGS. 9B and 9C, at block 510, the remote access controller engine 306a in the remote access controller device 306 in each node device 204a-204c/300, 206a-206c/300, and 208a-208c/300 may then perform operational information transmission operations 904 via the communication system 308 in that node device 300 and to the node device efficiency management subsystem 210a in the datacenter efficiency management system 210. As such, at block 510, the datacenter efficiency management system 210 may receive operational information for each of the node devices 204a-204c, 206a-206c, and 208a-208c, and one of skill in the art in possession of the present disclosure will appreciate how the operational information for each of the node devices 204a-204c, 206a-206c, and 208a-208c may be stored for utilization as discussed below to rank those node devices based on the power they are consuming while providing their currently deployed workloads.

In response to receiving the operational information for each of the node devices 204a-204c, 206a-206c, and 208a-208c (e.g., via the communication system 408 in the datacenter efficiency management system 210/400), the node device efficiency management sub-engine 404a in the datacenter efficiency management engine 404 of the datacenter efficiency management system 210/400 may utilize the operational information to generate workload performance efficiency rankings. For example, the loading/bandwidth of the components 304a-304d and the communication system 308 in a node device 300, the power consumption of the components 304a-304d and the communication system 308 in that node device 300, and the health of the components 304a-304d and the communication system 308 in that node device 300 allows the loading, power consumption, and health of that node device 300 to be determined such that it may be used to rank that node device relative to other node devices. Furthermore, the storage of the operating information may allow historical loading, power consumption, and health of that node device 300 to be utilized in ranking that node device relative to other node devices. As such, as the node devices 204a-204c, 206a-206c, and 208a-208c perform workloads, they may be dynamically ranked relative to each other based on their power consumption and workload loading/bandwidth.

Furthermore, in some embodiments, the operational information for each of the node devices 204a-204c, 206a-206c, and 208a-208c may be utilized in the power capping of node devices within a homogenous node group. For example, using the operational information received at block 510, the node group efficiency management subsystem 210b in the datacenter efficiency management system 210/400 may operate with the remote access controller device 306 in each node device 300 to power cap that node device 300. For example, at block 506, the node group efficiency management subsystem 210b in the datacenter efficiency management system 210/400 may operate with the remote access controller device 306 in each node device 204a-204c/300, 206a-206c/300, and 208a-208c/300 to power cap that node device based on the power cap for its homogenous node group, the components that are included in that node device (e.g., the components, peripheral devices, etc.), and the health of those components. As such, a node device in a homogenous node group may receive a portion of the power included in the power cap for that homogenous node group based on the components in that node device and the health of those components, with power provided to any particular node device dynamically changing as the health of its components change, thus efficiently distributing power caps across node devices in each of the homogenous node groups.

The method 500 then proceeds to decision block 512 where it is determined whether there is inefficient workload placement. In an embodiment, at decision block 512, the node device efficiency management subsystem 210a in the datacenter efficiency management system 210 may operate to determine whether there is inefficiency workload placement in the datacenter based on, for example, any particular node device deviating from a desired workload performance level or power efficiency, and/or based on other criteria that would be apparent to one of skill in the art in possession of the present disclosure. For example, as discussed above workloads performed by the node device 204a-204c/300, 206a-206c/300, and 208a-208c/300 in the datacenter may be characterized as compute-intense workloads, networking-intense workloads, storage-intense workloads, graphics-intense workloads, accelerator-intense workloads, and/or with other workload characterizations known in the art, and thus node devices performing similarly characterized workloads may be compared by the node device efficiency management subsystem 210a based on their performance and power efficiency in performing those similarly characterized workloads. Furthermore, the node device efficiency management subsystem 210a may also utilize the vendor specifications for any of the node devices discussed above to identify ideal workload bandwidth for that node device that provides the optimal power efficiency for that node device for any particular workload characterization. As such, at decision block 512 the node device efficiency management subsystem 210a may determine whether node devices are providing workloads that they are most power efficient at providing according to their vendor specification, may compare how different node devices are consuming power when providing similar workloads, and/or may perform other operations to identify whether a workload is inefficiently deployed or placed on a node device.

If, at decision block 512, it is determined that there is no inefficient workload placement, the method 500 returns to block 510. As such, the method 500 may loop such that the node devices 204a-204c/300, 206a-206c/300, and 208a-208c/300 perform workloads and the datacenter efficiency management system 210 generates (or dynamically adjusts) workload performance efficiency rankings as long as workloads are determined to be efficiently deployed or otherwise placed in node devices in the datacenter 200. If at decision block 512 it is determined that there is inefficient workload placement, the method 500 proceeds to block 514 where the datacenter efficiency management system migrates workload(s) between node devices. In an embodiment of decision block 514, the node group efficiency management subsystem 210b in the datacenter efficiency management system 210 may determine that a workload is deployed or otherwise placed inefficiently on a node device in the datacenter 200. For example, at decision block 514 the node group efficiency management subsystem 210b may determine that a node device is providing workload(s) that it is not power efficient at providing according to its vendor specification, may determine that a different node device is consuming less power when providing a similar workload at the same (or similar) performance level, and/or may identify other workload placement inefficiencies that would be apparent to one of skill in the art in possession of the present disclosure, and in response may migrate that workload to another node device in the datacenter 200. Similarly, telemetry data may indicate that components in a node device are unhealthy or otherwise not operating optimally, which allows the datacenter efficiency management system 210 to migrate workload(s) being performed by that node device to a node device with healthier components (e.g., optimally operating components).

Figure 10:
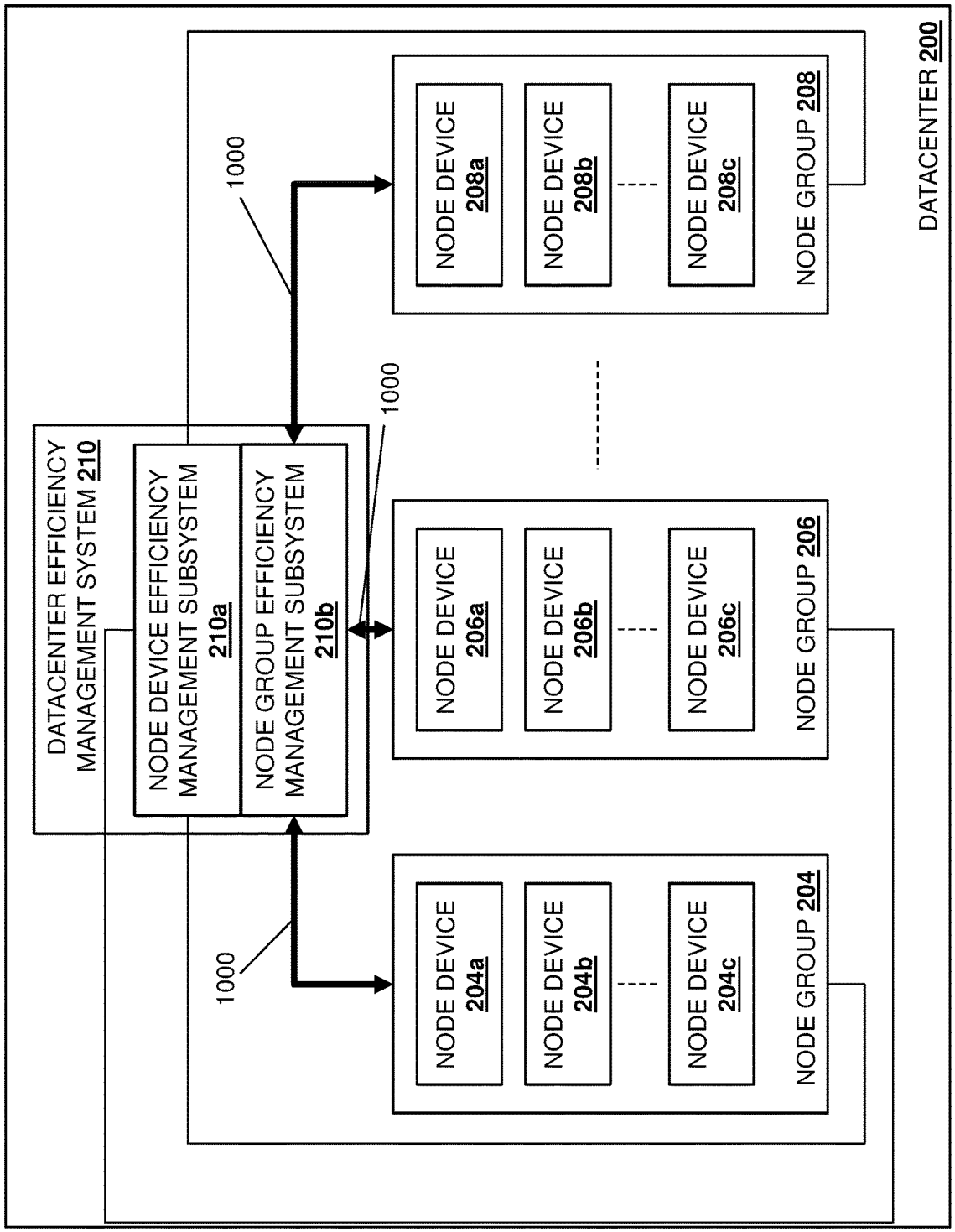
FIG. 10 is a schematic view illustrating an embodiment of the datacenter of FIG. 2 operating during the method of FIG. 5.

With reference to FIG. 10, in an embodiment of block 514, the node group efficiency management subsystem 210b in the datacenter efficiency management system 210 may perform workload migration operations 1000 that may include migrating workloads that were determined at decision block 512 to be inefficiently placed on any of the node devices 204a-204c/300, 206a-206c/300, and 208a-208c/300 to others of the node devices 204a-204c/300, 206a-206c/300, and 208a-208c/300 that may have been determined to be more efficient in providing those workloads (e.g., based on their vendor specification indicating they are more efficient at performing that type workload, based on an identification that they have performed similar workload(s) with high power efficiency/lower power consumption, etc.) For example, for workloads with the same characterization being performed by a first node device and a second node device, the node group efficiency management subsystem 210b may determine at decision block 512 that a first workload performance efficiency ranking of the first node device is lower than a second workload performance efficiency ranking of the second node device and, in response, may migrate the first workload from the first node device to the second node device at block 514.

As such, workloads may be migrated from the node devices at the bottom of the workload performance efficiency rankings to ensure that power efficient node devices are performing workloads. Furthermore, in situations where all of the node devices are ranked substantially equally based on the workload performance efficiency rankings, the workloads in the datacenter may be redistributed across all the node devices so that those node devices are equally loaded across the homogenous node groups. In some examples, workloads being performed by a first homogenous node group may be compared to workloads being performed by a second homogenous node group so that homogenous node group workload performance and power efficiency may be optimized in substantially the same manner as described above for the individual node devices. The method 500 may then return to block 510. As such, the method 500 may loop such that the node devices 204a-204c/300, 206a-206c/300, and 208a-208c/300 perform workloads and the datacenter efficiency management system 210 generates (or dynamically adjusts) workload performance efficiency rankings and migrates workloads to more efficient node devices when those workloads are determined to be inefficiently deployed or otherwise placed in node devices in the datacenter 200, thus providing efficient management of the power consumption of the datacenter 200.

Thus, systems and methods have been described that provide for the efficient management of node devices in homogeneous node groups and workload placement in a datacenter in a manner that attempts to optimize power consumption by the datacenter while ensuring that workload performance requirements (e.g., Service Level Agreements (SLAs)) are met. For example, a datacenter may include a datacenter efficiency management system coupled to node devices. For each of the node devices and based on a power consumption associated with that node device and a performance associated with that node device, the datacenter efficiency management system generates a node group ranking that it uses to group subsets of the node devices into respective homogenous node groups, and then deploys a respective workload on at least one node device in each of the homogenous node groups. Based on at least one of a node workload bandwidth, a node power consumption, and a node health of each node device on which a workload was deployed, the datacenter efficiency management system then generates a workload performance efficiency ranking of the node devices that it then uses to migrate at least one workload between the node devices. As such, workloads may be deployed on and/or migrated to node devices that will perform them in the most power-efficient manner, thus reducing the costs of operating the datacenter.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A datacenter, comprising:
a plurality of node devices; and
a datacenter efficiency management system that is coupled to each of the node devices and that is configured to:
  generate, for each of the plurality of node devices based on a power consumption estimation for that node device and a performance estimation for that node device, a node group ranking;
  group, based on the node group ranking generated for each of the plurality of node devices, subsets of the plurality of node devices into respective homogenous node groups that each include node devices that are homogenous with respect to their power consumption estimation and performance estimation such that the subset of the plurality of node devices in any one of the homogenous node groups include node devices that are estimated to consume power in a power consumption range for that homogeneous node group that is different from the other homogeneous node groups, and that are estimated to perform in a performance range for that homogeneous node group that is different from the other homogeneous node groups;
  power cap at least one of the homogenous node groups based on a node component inventory that identifies the components included in the subset of the plurality of node devices in that homogeneous node group, and a node component health of the components included in the subset of the plurality of node devices in that homogeneous node group;
  deploy a respective workload on each node device in each of the homogenous node groups;
  generate, based on each of a node workload bandwidth, a node power consumption, and a node health of each node device that is indicative of a level of performance of that node device in performing the workload deployed on that node device, a workload performance efficiency ranking for that node device that identifies a relative efficiency of that node device in performing its respective workload relative to the other node devices in performing their respective workloads; and
  migrate, based on a first workload performance efficiency ranking of a first node device that is included in the plurality of node devices and that is part of a first homogenous node group and a second workload performance efficiency ranking of a second node device that is included in the plurality of node devices and that is part of a second homogenous node group, a first workload between the first node device and the second node device.

2. The system of claim 1, wherein the power capping of the at least one of the homogenous node groups is based on a total power available in a datacenter that includes the plurality of node devices.

3. The system of claim 1, wherein the node health of each node device provides a measure of the operation of that node device relative to an optimal operation of that node device.

4. The system of claim 1, wherein the second node device in the second homogenous node group has a relatively lower performance and power efficiency than the first node devices in the first homogenous node group.

5. The system of claim 1, wherein the power consumption estimation used in the node group ranking of each node device is based on at least one of a node device component inventory of node device components included in that node device, and wherein the performance estimation used in the node group ranking of each node device is based on performance testing results generated by previous performance tests on that node device.

6. The system of claim 5, wherein the deploying the respective workload on each node device in each of the homogenous node groups includes:
  deploying a second workload on the first node devices included in the first performance/power efficiency homogenous node group; and
  deploying a third workload on one of the second node devices included in the second homogenous node group, wherein the third workload is a lower performance workload than the second workload.

7. An Information Handling System (IHS), comprising:
a processing system; and
a memory system that is coupled to the processing system and that includes instructions that, when executed by the processing system, cause the processing system to provide a datacenter efficiency management engine that is configured to:
  generate, for each of a plurality of node devices based on a power consumption estimation for that node device and a performance estimation for that node device, a node group ranking;
  group, based on the node group ranking generated for each of the plurality of node devices, subsets of the plurality of node devices into respective homogenous node groups that each include node devices that are homogenous with respect to their power consumption estimation and performance estimation such that the subset of the plurality of node devices in any one of the homogenous node groups include node devices that are estimated to consume power in a power consumption range for that homogeneous node group that is different from the other homogeneous node groups, and that are estimated to perform in a performance range for that homogeneous node group that is different from the other homogeneous node groups;
  power cap at least one of the homogenous node groups based on a node component inventory that identifies the components included in the subset of the plurality of node devices in that homogeneous node group, and a node component health of the components included in the subset of the plurality of node devices in that homogeneous node group;
  deploy a respective workload on each node device in each of the homogenous node groups;
  generate, based on each of a node workload bandwidth, a node power consumption, and a node health of each node device that is indicative of a level of performance of that node device in performing the workload deployed on that node device, a workload performance efficiency ranking for that node device that identifies a relative efficiency of that node device in performing its respective workload relative to the other node devices in performing their respective workloads; and
  migrate, based on a first workload performance efficiency ranking of a first node device that is included in the plurality of node devices and that is part of a first homogenous node group and a second workload performance efficiency ranking of a second node device that is included in the plurality of node devices and that is part of a second homogenous node group, a first workload between the first node device and the second node device.

8. The IHS of claim 7, wherein the power capping of the at least one of the homogenous node groups is based on a total power available in a datacenter that includes the plurality of node devices.

9. The IHS of claim 7, wherein the node health of each node device provides a measure of the operation of that node device relative to an optimal operation of that node device.

10. The IHS of claim 7, wherein the second node device in the second homogenous node group has a relatively lower performance and power efficiency than the first node devices in the first homogenous node group.

11. The IHS of claim 7, wherein the power consumption estimation used in the node group ranking of each node device is based on at least one of a node device component inventory of node device components included in that node device, and wherein the performance estimation used in the node group ranking of each node device is based on performance testing results generated by previous performance tests on that node device.

12. The IHS of claim 11, wherein the deploying the respective workload each node device in each of the homogenous node groups includes:
deploying a second workload on the first node devices included in the first homogenous node group; and
deploying a third workload on the second node devices included in the second homogenous node group, wherein the third workload is a lower performance workload than the second workload.

13. The IHS of claim 7, wherein the datacenter efficiency management engine is configured to:
determine that the first workload performance efficiency ranking of the first node device is lower than the second workload performance efficiency ranking of the second node device and, in response, migrate the first workload from the first node device to the second node device.

14. A method for managing datacenter efficiency, comprising:
generating, by a datacenter efficiency management system for each of a plurality of node devices based on a power consumption estimation for that node device and a performance estimation for that node device, a node group ranking;
grouping, by the datacenter efficiency management system based on the node group ranking generated for each of the plurality of node devices, subsets of the plurality of node devices into respective homogenous node groups that each include node devices that are homogenous with respect to their power consumption estimation and performance estimation such that the subset of the plurality of node devices in any one of the homogenous node groups include node devices that are estimated to consume power in a power consumption range for that homogeneous node group that is different from the other homogeneous node groups, and that are estimated to perform in a performance range for that homogeneous node group that is different from the other homogeneous node groups;
power capping, by the datacenter efficiency management system, at least one of the homogenous node groups based on a node component inventory that identifies the components included in the subset of the plurality of node devices in that homogeneous node group, and a node component health of the components included in the subset of the plurality of node devices in that homogeneous node group;

deploying, by the datacenter efficiency management system, a respective workload on each node device in each of the homogenous node groups;
generating, by the datacenter efficiency management system based on each of a node workload bandwidth, a node power consumption, and a node health of each node device that is indicative of a level of performance of that node device in performing the workload deployed on that node device, a workload performance efficiency ranking for that node device that identifies a relative efficiency of that node device in performing its respective workload relative to the other node devices in performing their respective workloads; and
migrating, by the datacenter efficiency management system based on a first workload performance efficiency ranking of a first node device that is included in the plurality of node devices and that is part of a first homogenous node group and a second workload performance efficiency ranking of a second node device that is included in the plurality of node devices and that is part of a second homogenous node group, a first workload between the first node device and the second node device.

15. The method of claim 14, wherein the power capping of the at least one of the homogenous node groups is based on a total power available in a datacenter that includes the plurality of node devices.

16. The method of claim 14, wherein the node health of each node device provides a measure of the operation of that node device relative to an optimal operation of that node device.

17. The method of claim 14, wherein the second node device in the second performance/power efficiency homogenous node group has a relatively lower performance and power efficiency than the first node devices in the first homogenous node group.

18. The method of claim 14, wherein the power consumption estimation used in the node group ranking of each node device is based on at least one of a node device component inventory of node device components included in that node device, and wherein the performance estimation used in the node group ranking of each node device is based on performance testing results generated by previous performance tests on that node device.

19. The method of claim 18, wherein the deploying the respective workload on each node device in each of the homogenous node groups includes:
deploying, by the datacenter efficiency management system, a second workload on the first node devices included in the first homogenous node group; and
deploying, by the datacenter efficiency management system, a third workload on the second node devices included in the second homogenous node group, wherein the third workload is a lower performance workload than the second workload.

20. The method of claim 14, further comprising:
determining, by the datacenter efficiency management system, that the first workload performance efficiency ranking of the first node device is lower than the second workload performance efficiency ranking of the second node device and, in response, migrating the first workload from the first node device to the second node device.

* * * * *

UNITED STATES PATENT AND TRADEMARK OFFICE
CERTIFICATE OF CORRECTION

| | | |
|---|---|---|
| PATENT NO. | : 11,915,061 B2 | Page 1 of 1 |
| APPLICATION NO. | : 17/510601 | |
| DATED | : February 27, 2024 | |
| INVENTOR(S) | : Mukherjee et al. | |

It is certified that error appears in the above-identified patent and that said Letters Patent is hereby corrected as shown below:

In the Claims

Claim 4, Column 17, Line 62, "the first node devices" should read --the first node device--

Claim 6, Column 18, Line 8, "on the first node devices" should read --on the first node device--

Claim 6, Column 18, Line 9, delete "performance/power efficiency"

Claim 6, Column 18, Lines 11-12, "on one of the second node devices" should read --on the second node device--

Claim 10, Column 19, Line 12, "the first node devices" should read --the first node device--

Claim 12, Column 19, Line 23, "each node device" should read --on each node device--

Claim 12, Column 19, Line 25, "on the first node devices" should read --on the first node device--

Claim 12, Column 19, Line 27, "on the second node devices" should read --on the second node device--

Claim 17, Column 20, Line 35, delete "performance/power efficiency"

Claim 17, Column 20, Line 37, "the first node devices" should read --the first node device--

Claim 19, Column 20, Line 51, "on the first node devices" should read --on the first node device--

Claim 19, Column 20, Line 54, "on the second node devices" should read --on the second node device--

Signed and Sealed this
Twenty-third Day of April, 2024

Katherine Kelly Vidal
*Director of the United States Patent and Trademark Office*